United States Patent [19]

Gingue et al.

[11] Patent Number: 5,670,748
[45] Date of Patent: Sep. 23, 1997

[54] FLAME RETARDANT AND SMOKE SUPPRESSANT COMPOSITE ELECTRICAL INSULATION, INSULATED ELECTRICAL CONDUCTORS AND JACKETED PLENUM CABLE FORMED THEREFROM

[75] Inventors: Robert N. Gingue, Westminster; Charles A. Glew, Framingham; Anthony E. Sansone, Leominster; Homaira K. Naseem, Boylston, all of Mass.

[73] Assignee: AlphaGary Corporation, Leominster, Mass.

[21] Appl. No.: 389,214

[22] Filed: Feb. 15, 1995

[51] Int. Cl.$^6$ ......................................... H01B 7/28
[52] U.S. Cl. ........................... 174/120 R; 174/121 A; 174/113 R
[58] Field of Search ............... 174/110 R, 110 PM, 174/110 F, 110 V, 120 R, 120 SR, 121 A, 113 R

[56] References Cited

U.S. PATENT DOCUMENTS

| | | | |
|---|---|---|---|
| 3,064,073 | 11/1962 | Downing et al. | 174/110 |
| 3,529,340 | 9/1970 | Polizzano et al. | 29/202.5 |
| 3,567,846 | 3/1971 | Brorein | 174/102 |
| 3,930,984 | 1/1976 | Pitchford | 208/10 X |
| 4,104,481 | 8/1978 | Wilkenloh et al. | 174/28 |
| 4,107,354 | 8/1978 | Wilkenloh et al. | 427/118 |
| 4,204,086 | 5/1980 | Suzuki | 174/102 R |
| 4,255,318 | 3/1981 | Kaide et al. | 260/42.18 X |
| 4,274,997 | 6/1981 | Schneider et al. | 260/45.75 X |
| 4,284,842 | 8/1981 | Arroyo et al. | 174/107 |
| 4,319,940 | 3/1982 | Arroyo et al. | 156/56 |
| 4,352,701 | 10/1982 | Shimba et al. | 156/51 |
| 4,412,094 | 10/1983 | Dougherty et al. | 174/110 F |
| 4,468,089 | 8/1984 | Brorein | 350/96.23 |
| 4,468,435 | 8/1984 | Shimba et al. | 428/383 |
| 4,562,302 | 12/1985 | Checkland et al. | 174/118 |
| 4,789,589 | 12/1988 | Baxter | 428/317.5 |
| 4,892,683 | 1/1990 | Naseem | 252/609 |
| 4,963,609 | 10/1990 | Anderson et al. | 524/413 |
| 4,983,326 | 1/1991 | Vandersall | 252/603 X |
| 5,036,121 | 7/1991 | Coaker et al. | 524/100 X |
| 5,059,651 | 10/1991 | Ueno | 524/424 X |
| 5,104,735 | 4/1992 | Cioffi et al. | 428/383 X |
| 5,158,999 | 10/1992 | Swales et al. | 524/100 X |
| 5,164,258 | 11/1992 | Shida et al. | 428/319.3 X |
| 5,173,960 | 12/1992 | Dickinson | 385/100 X |
| 5,358,786 | 10/1994 | Ishikawa et al. | 428/380 X |

FOREIGN PATENT DOCUMENTS

| | | | |
|---|---|---|---|
| 2156229 | 5/1973 | France . | |
| 2220549 | 10/1974 | France . | |
| 3409369 | 9/1985 | Germany | 174/110 F |
| 47-9499 | 3/1972 | Japan | 174/110 F |
| 2125207 | 2/1984 | United Kingdom . | |

*Primary Examiner*—Hyung S. Sough
*Assistant Examiner*—Chau N. Nguyen
*Attorney, Agent, or Firm*—McAndrews, Held & Malloy, Ltd.

[57] ABSTRACT

A flame retardant and smoke suppressant electrical insulation composition for an electrical conductor comprises an inner layer and an outer layer. The inner layer, which contacts and surrounds the conductor, comprises a foamed polymeric material selected from the group consisting of polyolefins and polyurethane. The outer layer, which contacts and surrounds the inner layer, comprises a halogenated polymeric material and at least one outer layer additive to render the outer layer flame retardant and smoke suppressant. A flame retardant and smoke suppressant insulated electrical conductor comprises a length of electrically conductive material surrounded by the insulation composition. A flame retardant and smoke suppressant jacketed electrical cable comprises a plurality of insulated electrical conductors. An outer jacket, which substantially surrounds the insulated electrical conductors, comprises a halogenated polymeric material and at least one outer jacket additive to render the outer jacket flame retardant and smoke suppressant.

3 Claims, 1 Drawing Sheet

FLAME RETARDANT AND SMOKE SUPPRESSANT COMPOSITE ELECTRICAL INSULATION, INSULATED ELECTRICAL CONDUCTORS AND JACKETED PLENUM CABLE FORMED THEREFROM

FIELD OF THE INVENTION

The present invention relates to insulated electrical conductors and jacketed electrical cables. More particularly, the present invention relates to composite electrical insulation exhibiting reduced flame spread, reduced smoke evolution, and favorable electrical properties. The present invention also relates to insulated electrical conductors and jacketed plenum cable formed from the flame retardant and smoke suppressant composite insulation.

BACKGROUND OF THE INVENTION

A broad range of electrical conductors and electrical cables are installed in modern buildings for a wide variety of uses. Such uses include data transmission between computers, voice communications, as well as control signal transmission for building security, fire alarm, and temperature control systems. These cable networks extend throughout modern office and industrial buildings, and frequently extend through the space between the dropped ceiling and the floor above. Ventilation system components are also frequently extended through this space for directing heated and chilled air to the space below the ceiling and also to direct return air exchange. The space between the dropped ceiling and the floor above is commonly referred to as the plenum area. Electrical conductors and cables extending through plenum areas are governed by special provisions of the National Electric Code ("NEC").

Because of concerns that flame and smoke could travel along the extent of a plenum area in the event the electrical conductors and cable were involved in a fire, the National Fire Protection Association ("NFPA") has developed a standard to reduce the amount of flammable material incorporated into insulated electrical conductors and jacketed cables. Reducing the amount of flammable material would, according to the NFPA, diminish the potential of the insulating and jacket materials from spreading flames and evolving smoke to adjacent plenum areas and potentially to more distant and widespread areas throughout a building.

In 1975, the NFPA recognized the potential flame and smoke hazards created by burning cables in plenum areas, and adopted in the NEC a standard for flame retardant and smoke suppressant cables. This standard, commonly referred to as "the Plenum Cable Standard", permits the use of cable without conduit, so long as the cable exhibits low smoke and flame retardant characteristics. The test method for measuring these characteristics is commonly referred to as the Steiner Tunnel Test. The Steiner Tunnel Test has been adapted for the burning of cables according to the following test protocols: NFPA 262, Underwriters Laboratories (U.L.) 910, or Canadian Standards Association (CSA) FT-6. The test conditions for each of the U.L. 910 Steiner Tunnel Test, CSA FT-6, and NFPA 262 are as follows: a 300,000 BTU/hour flame is applied for 20 minutes to ten 24-foot lengths of test cables mounted on a horizontal tray within a tunnel. The criteria for passing the Steiner Tunnel Test are as follows:

A. Flame spread—flame travel less than 5.0 feet.
B. Smoke generation:
 1. Maximum optical density of smoke less than 0.5.
 2. Average optical density of smoke less than 0.15.

In plenum applications for voice and data transmission, electrical conductors and cables should exhibit low smoke evolution, low flame spread, and favorable electrical properties. Materials are generally selected for plenum applications such that they exhibit a balance of favorable and unfavorable properties. In this regard, each commonly employed material has a unique combination of desirable characteristics and practical limitations. Without regard to flame retardancy and smoke suppressant characteristics, olefin polymers, such as polyethylene and polypropylene, are melt extrudable thermoplastic materials having favorable electrical properties as manifested by their very low dielectric constant and low dissipation factor.

Dielectric constant is the property of an insulation material which determines the amount of electrostatic energy stored per unit potential gradient. Dielectric constant is normally expressed as a ratio. The dielectric constant of air is 1.0, while the dielectric constant for polyethylene is 2.2. Thus, the capacitance of polyethylene is 2.2 times that of air. Dielectric constant is also referred to as the Specific Inductive Capacity or Pesmitivity.

Dissipation factor refers to the energy lost when voltage is applied across an insulation material, and is the cotangent of the phase angle between voltage and current in a reactive component. Dissipation factor is quite sensitive to contamination of an insulation material. Dissipation factor is also referred to as the Power Factor (of dielectrics).

Fluorinated ethylene/propylene polymers exhibit electrical performance comparable to non-halogenated to olefin polymers, such as polyethylene, but are over 15 times more expensive per pound. Polyethylene also has favorable mechanical properties as a cable jacket as manifested by its tensile strength and elongation to break. However, polyethylene exhibits unfavorable flame and smoke characteristics.

Limiting Oxygen Index (ASTM D-2863) ("LOI") is a test method for determining the percent concentration of oxygen that will support flaming combustion of a test material. The greater the LOI, the less susceptible a material is to burning. In the atmosphere, there is approximately 21% oxygen, and therefore a material exhibiting an LOI of 22% or more cannot burn under ambient conditions. As pure polymers without flame retardant additives, members of the olefin family, namely, polyethylene and polypropylene, have an LOI of approximately 19. Because their LOI is less than 21, these olefins exhibit disadvantageous properties relative to flame retardancy in that they do not self-extinguish flame, but propagate flame with a high rate of heat release. Moreover, the burning melt drips on the surrounding areas, thereby further propagating the flame.

Table 1 below summarizes the electrical performance and flame retardancy characteristics of several polymeric materials. Besides fluorinated ethylene/propylene, other melt extrudable thermoplastic generally do not provide a favorable balance of properties (i.e., high LOI, low dielectric constant, and low dissipation factor). Moreover, when flame retardant and smoke suppressant additives are included within thermoplastic materials, the overall electrical properties generally deteriorate.

TABLE 1

| | Electrical Properties | Fire Retardancy Characteristics NBS Smoke Values Optical Density, DMC |
| --- | --- | --- |

| Material | Dielectric Constant 1 MHz, 23° C. | Dissipation Factor 1 MHz, 23° C. | LOI % | Flaming Mode | Non-Flaming Mode |
| --- | --- | --- | --- | --- | --- |
| PE | 2.2 | .00006–.0002 | 19 | 387 | 719 |
| FRPE | 2.6–3.0 | .003–.037 | 28–32 | — | — |
| FEP | 2.1 | .00055 | >80 | — | — |
| PVC | 2.7–3.5 | .024–.070 | 32 | 740 | 280 |
| RSFRPVC | 3.2–3.6 | .018–.080 | 39 | 200 | 190 |
| LSFRPVC | 3.5–3.8 | .038–.080 | 49 | <200 | <170 |

In the above table, PE designates polyethylene, FRPE designates polyethylene with flame retardant additives, FEP designates fluorinated ethylene/propylene polymer, PVC designates polyvinylchloride, RSFRPVC designates reduced smoke flame retardant polyvinylchloride, LSFR-PVC designates low smoke flame retardant polyvinylchloride, LOI designates Limiting Oxygen Index, NBS designates the National Bureau of Standards, and DMC designates Maximum Optical Density Corrected.

In general, the electrical performance of an insulating material is enhanced by foaming or expanding the corresponding solid material. Foaming also decreases the amount of flammable material employed for a given volume of material. Accordingly, a foamed material is preferably employed to achieve a favorable balance of electrical properties and flame retardancy.

In addition to the requirement of low smoke evolution and flame spread for plenum applications, there is a growing need for enhanced electrical properties for the transmission of voice and data over twisted pair cables. In this regard, standards for electrical performance of twisted pair cables are set forth in Electronic Industry Association/Telecommunications Industry Association (EIA/TIA) document TSB 36 and 40. The standards include criteria for attenuation, impedance, crosstalk, and conductor resistance.

In the U.S. and Canada, the standards for flame retardancy for voice communication and data communication cables are stringent. The plenum cable test (U.L. 910/CSA FT-6) and riser cable test U.L. 1666 are significantly more stringent than the predominantly used International fire test IEC 332-3, which is similar to the IEEE 383/U.L. 1581 test. Table 2 below summarizes the standards required for various U.L. and CSA cable designations:

TABLE 2

| U.L./CSA Designation | Cable Fire Test | Flame Energy |
| --- | --- | --- |
| CMP/MPP | Plenum U.L. 910 CSA FT-6 Horizontal | 300,000 BTU/hour |
| CMR/MPR | Riser U.L. 1666 Vertical | 527,000 BTU/hour |
| CMG/MPG | FT-4 Vertical | 70,000 BTU/hour Burner angle 20° |
| CM/MP | IEEE 1581 Vertical | 70,000 BTU/hour Burner angle 0° |

The principal electrical criteria can be satisfied based upon the dielectric constant and dissipation factor of an insulation or jacketing material. Secondarily, the electrical criteria can be satisfied by certain aspects of the cable design such as, for example, the insulated twisted pair lay lengths. Lay length, as it pertains to wire and cable, is the axial distance required for one cabled conductor or conductor strand to complete one revolution about the axis of the cable. Tighter and/or shorter lay lengths generally improve electrical properties.

SUMMARY OF THE INVENTION

The present cable design incorporates an inner layer comprising a foamed or expanded polyolefin material and an outer layer comprising a halogenated polymeric material. This composite insulation provides a heterogeneous core that optimizes the electrical characteristics (i.e., the dielectric constant and dissipation factor) of the material of the inner layer in direct contact with the copper conductor, while adding an outer layer over this substrate that incorporates the desired properties of intumescent char and flame retardancy. Intumescence refers to the foaming or swelling of a plastic or other material when exposed to high surface temperatures or flames. Thus, intumescent char is a foamed or swelled char.

A single conductor can be mated in a pair or quad configuration of various numbers of conductors to form a cable. The predominant cable construction is a 4-pair core. This typical 4-pair composite insulated core is then jacketed with a halogenated low smoke and flame retardant material for plenum cable applications.

The preferred insulation composition comprises:
 (a) an inner layer comprising a foamed polymeric material selected from the group consisting of polyolefins and polyurethane, the inner layer contacting and surrounding the conductor; and
 (b) an outer layer comprising a halogenated polymeric material and at least one outer layer additive, the outer layer contacting and surrounding the inner layer, the at least one outer layer additive rendering the outer layer flame retardant and smoke suppressant.

The preferred foamed inner layer polymeric material comprises foamed polyethylene or foamed polypropylene. Foamed polyurethane could also be employed, as well as silicone polymers such as hexamethyldisiloxane, octamethyltrisiloxane, deca methyltetrasiloxane.

The inner layer preferably further comprises at least one inner layer additive, the at least inner layer additive rendering the inner layer flame retardant and smoke suppressant. The at least one inner layer additive is preferably selected from the group consisting of magnesium complexes, molybdate complexes, phosphate complexes, alumina trihydrate, and zinc borate.

The most preferred inner layer additive is magnesium hydroxide, which simultaneously renders the inner layer both flame retardant and smoke suppressant. Separate inner layer additives could also be employed for flame retardancy and for smoke suppression.

The preferred molybdate complexes comprise molybdenum oxide and zinc molybdate. The preferred phosphate complexes comprise ammonium polyphosphate and melamine phosphate.

The preferred halogenated polymeric material is selected from the group consisting of polyvinylchloride (PVC), polyvinyladinechloride (PVDC), polyvinyladinefluoride (PVDF), and ethylchlorotetrafluoroethylene (ECTFE).

The at least one outer layer additive is selected from the group consisting of antimony trioxide, decabromodiphenyloxide, brominated dioctylphthalate, brominated diisooctylphthalate, decachlorodiphenyloxide, chlorinated dioctylphthalate, chlorinated diisooctylphthalate, magnesium complexes, molybdate complexes, phosphate complexes, alumina trihydrate, and zinc borate. The most preferred outer layer additive is the combination of antimony trioxide and at least one of decachlorodiphenyloxide, chlorinated dioctylphthalate, and chlorinated diisooctylphthalate.

DETAILED DESCRIPTION OF THE PREFERRED EMBODIMENTS

The present composite insulation, insulated electrical conductors, and jacketed plenum cable construction exhibit favorable electrical properties for data transmission cables, while also exhibiting favorable flame retardancy and smoke suppressant characteristics to satisfy the UL 910 Steiner Tunnel Test.

A. Conductor and Insulation

Figure 1:
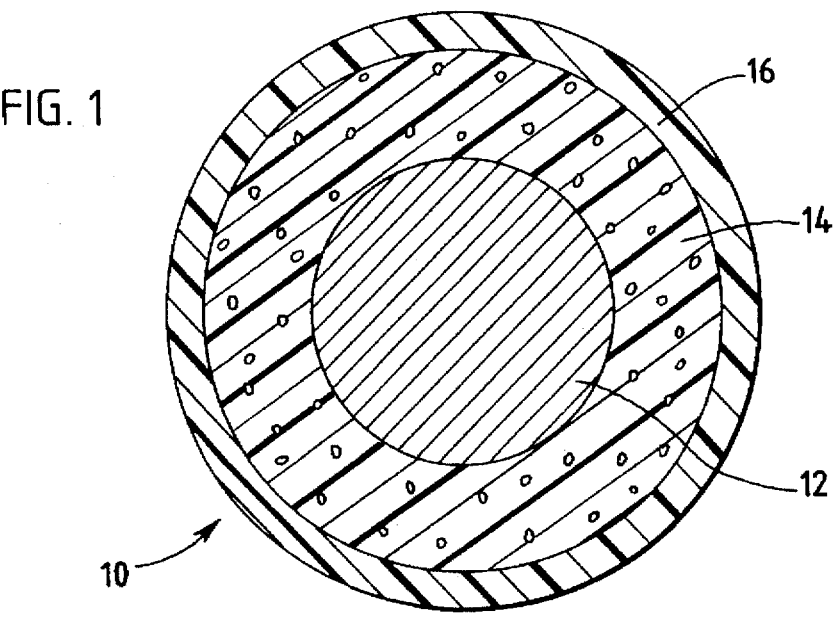
FIG. 1 is a sectional view of an insulated electrical conductor comprising a centrally disposed electrical conductor, a foamed polymeric inner layer surrounding the central conductor, and an outer layer comprising a halogenated polymeric material and at least one flame retardant and smoke suppressant additive.

Turning first to FIG. 1, an insulated electrical conductor 10 comprises a centrally disposed electrical conductor 12. A foamed polymeric inner layer 14 surrounds the central conductor 12. An outer layer 16 comprising a halogenated polymeric material and at least one flame retardant and smoke suppressant additive surrounds the inner layer 14.

Twisted pair cables predominantly employ 22-, 24- and 26-gauge copper and silver conductors. The conductors may be solid or stranded. For 24-gauge copper conductors, the wall thickness of conventional insulation may vary from approximately 0.005 to approximately 0.009 inches. The inner layer of the present composite insulation material, which is in contact with and surrounds the conductor, is preferably a foamed or expanded olefin polymer with an optional flame retardant additive. The inner layer material is foamed by gas injection using, for example, nitrogen. The inner layer material may also be foamed by addition of a chemical blowing agent such as, for example, azodicarbonamide, which can be incorporated or blended into the inner layer material prior to extrusion.

Typically, the foamed inner layer material extruded over the copper conductor is expanded from approximately 20–60%, with a final thickness of approximately 0.004–0.007 inches. In coextrusion, tandem extrusion, or two-pass extrusion, a skin of flame retardant halogenated material is applied as an outer layer over the foamed material in a thickness of approximately 0.002–0.004 inches.

The preferred formulation for the foamed inner layer material formed with the chemical blowing agent is as follows:

| Ingredient | Parts by weight |
| --- | --- |
| Ethylene-methylmethacrylate copolymer | 75–125 |
| Silane grafted polyethylene | 8–28 |
| Maleic acid derivative of ethylene/ x-olefin copolymer | 2–8 |
| Ethylene-methylmethacrylate maleic anhydride copolymer | 0.5–5 |
| Magnesium hydroxide | 120–190 |
| Tetrakis (methylene[3,5-di-tert-butyl-4-hydroxyhydrocinnamate] methane) | 0.15–1 |
| Polymeric hindered amine light stabilizer | 0.1–0.6 |
| Silicone based low-density polyethylene | 2–10 |
| Azodicarbonamide | 2–7 |
| Zinc stearate | 0.3–0.8 |

The preferred formulation for the foamed inner layer material formed by gas injection is as follows:

| Ingredient | Parts by weight |
| --- | --- |
| Ethylene-methylmethacrylate copolymer | 75–125 |
| Silane grafted polyethylene | 8–28 |
| Maleic acid derivative of ethylene/ x-olefin copolymer | 2–8 |
| Ethylene-methylmethacrylate maleic anhydride copolymer | 0.5–5 |
| Magnesium hydroxide | 120–190 |
| Tetrakis (methylene[3,5-di-tert-butyl-4-hydroxyhydrocinnamate] methane) | 0.15–1 |
| Polymeric hindered amine light stabilizer | 0.1–0.6 |
| Silicone based low-density polyethylene | 2–10 |

The preferred formulation for the outer layer halogenated material is as follows:

| Ingredient | Parts by weight |
| --- | --- |
| Homopolymer PVC Resin (electrical grade) | 100 |
| Hindered phenolic antioxidant | 0.1–0.5 |
| Antimony trioxide | 0.5–2.5 |
| Tribasic lead sulphate | 5–15 |
| Dibasic lead stearate | 0.1–0.3 |
| Barium/zinc stabilizer complex | 0.5–3.0 |
| Magnesium hydroxide | 5–15 |
| Molybdate complex | 15–35 |
| Permanent plasticizer | 10–30 |
| Stearic acid | 0.1–0.8 |
| Brominated aromatic ester | 23–35 |
| Alkyl aryl phosphate ester | 2–12 |
| Pentaerythritol | 2–12 |
| Aluminum trihydrate | 30–70 |

The above heterogeneous composite permits the use of an insulation material having favorable dielectric properties in contact with the copper conductor, while employing a flame retardent skin to mitigate flame propagation of the foamed material.

B. Jacketing Material Over Paired Conductors

Figure 2:
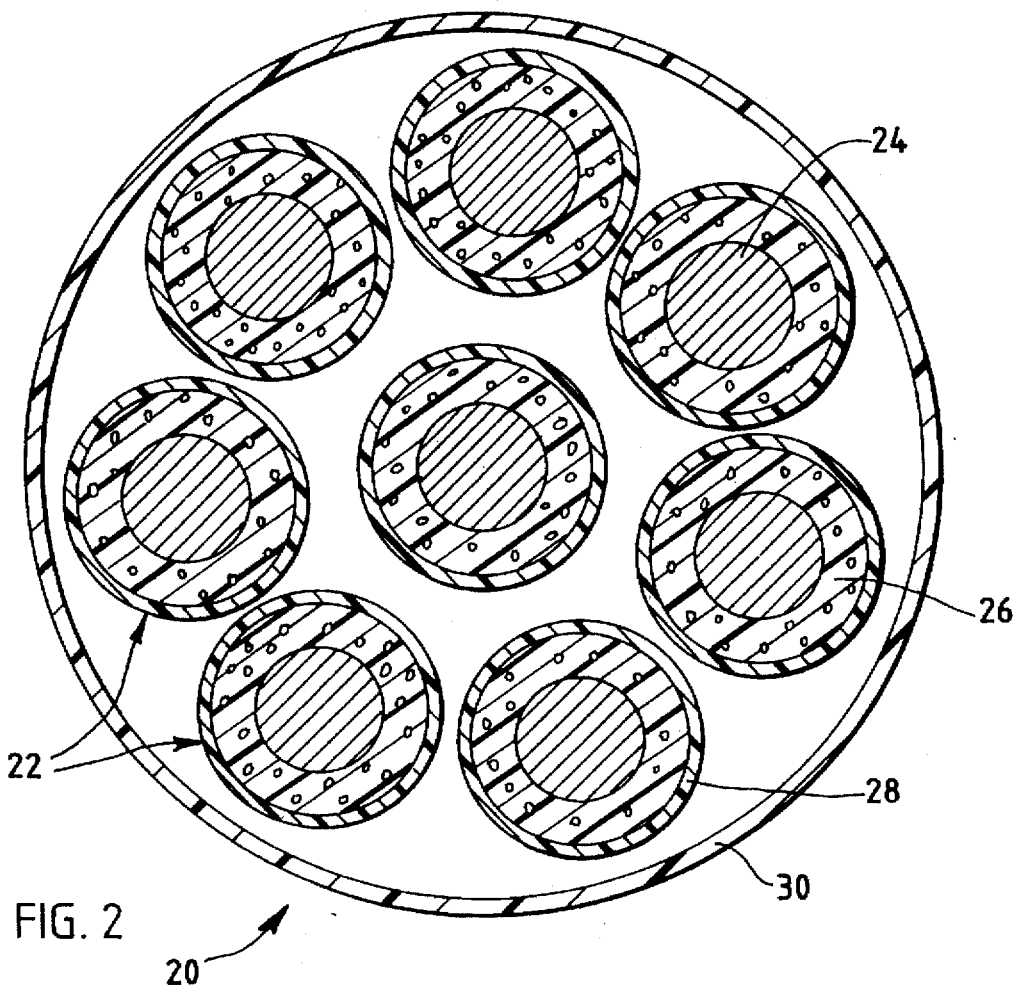
FIG. 2 is a sectional view of a 4-pair jacketed electrical cable for plenum applications comprising a plurality of insulated electrical conductors and an outer jacket comprising a halogenated polymeric material and at least one flame retardant and smoke suppressant additive.

Turning next to FIG. 2, a jacketed electrical cable 20 for plenum applications comprises 4 pairs of insulated electrical conductors, one pair of which is designated in FIG. 2 as insulated conductors 22. As shown in FIG. 2, each of insulated electrical conductors 22 comprises a centrally disposed electrical conductor 24, a foamed polymeric inner layer 26 surrounding the central conductor 24, and an outer layer 28 comprising a halogenated polymeric material and at least one flame retardant and smoke suppressant additive. An outer jacket 30 comprising a halogenated polymeric material and at least one flame retardant and smoke suppressant additive surrounds the 4 pairs of electrical conductors.

In the overall cable design, the foamed, skinned insulated conductors are paired together. Four paired cables represent the predominant application for the use of foamed, skinned insulated materials, although a different number of pairs (from 2 to 200 and greater) may also be employed. The foamed, skinned paired insulated conductors (for example, 4-pair cables) is then jacketed with a halogenated material. On a typical 4-pair cable, the jacket is approximately 0.0135–0.020 inches in thickness.

The preferred formulation for the halogenated jacketing material is as follows is substantially identical in terms of ingredients and parts by weight to the preferred formulation for the outer layer halogenated material set forth above.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A flame retardant and smoke suppressant insulation composition for an electrical conductor, the composition comprising:

(a) an inner layer comprising a foamed polymeric material selected from the group consisting of polyolefins and polyurethane, said inner layer contacting and surrounding the conductor; and (b) an outer layer comprising a halogenated polymeric material and at least one outer layer additive, said outer layer contacting and surrounding said inner layer, said at least one outer layer additive rendering said outer layer flame retardant and smoke suppressant;

wherein said at least one outer layer additive is antimony trioxide and at least one of decachlorodiphenyloxide, chlorinated dioctylphthalate, and chlorinated diisooctylphthalate.

2. A flame retardant and smoke suppressant insulated electrical conductor comprising:

(a) a length of electrically conductive material;

(b) an inner layer comprising a foamed polymeric material selected from the group consisting of polyolefins and polyurethane, said inner layer contacting and surrounding said length of electrically conductive material; and (c) an outer layer comprising a halogenated polymeric material and at least one outer layer additive, said outer layer contacting and surrounding said inner layer, said at least one outer layer additive rendering said outer layer flame retardant and smoke suppressants;

wherein said at least one outer layer additive is antimony trioxide and at least one of decachlorodiphenyloxide, chlorinated dioctylphthalate, and chlorinated diisooctylphthalate.

3. A flame retardant and smoke suppressant jacketed electrical cable comprising:

(a) a plurality of insulated electrical conductors, at least one of said insulated electrical conductors comprising:
        (1) a length of electrically conductive material;
        (2) a first layer comprising a foamed polymeric material selected from the group consisting of polyolefins and polyurethane, said first layer contacting and surrounding said length of electrically conductive materials; and
        (3) a second layer comprising a first halogenated polymeric material and at least one second layer additive, said second layer contacting and surrounding said first layer, said at least one second layer additive rendering said second layer flame retardant and smoke suppressant; and (b) an outer jacket comprising a second halogenated polymeric material and at least one outer jacket additive, said outer jacket substantially surrounding said plurality of insulated electrical conductors;

wherein said at least one second layer additive is antimony trioxide and at least one of decachlorodiphenyloxide, chlorinated dioctylphthalate, and chlorinated diisooctylphthalate.

* * * * *